United States Patent [19]

Tsunashima et al.

[11] Patent Number: 5,972,439
[45] Date of Patent: Oct. 26, 1999

[54] POLYESTER FILM AND PROCESS FOR THE PREPARATION THEREOF

[75] Inventors: Kenji Tsunashima, Kyoto; Tetsuya Tsunekawa; Masaaki Kotoura, both of Otsu, all of Japan

[73] Assignee: Toray Industries Inc., Tokyo, Japan

[21] Appl. No.: 08/669,968

[22] Filed: Jun. 25, 1996

[30] Foreign Application Priority Data

Dec. 5, 1995 [JP] Japan .................................. 7-316805

[51] Int. Cl.$^6$ .............................. B32B 5/02; B32B 27/18; B32B 27/36
[52] U.S. Cl. .............................. 428/1; 428/327; 428/364; 428/401; 428/480; 525/437; 525/444
[58] Field of Search ................................. 428/1, 480, 401, 428/402, 364, 359, 910, 357; 525/437, 444; 264/165, 211.12, 212

[56] References Cited

U.S. PATENT DOCUMENTS

| | | | |
|---|---|---|---|
| 4,980,232 | 12/1990 | Prevorsek et al. ...................... | 428/401 |
| 5,043,400 | 8/1991 | Tsuruta et al. .......................... | 525/437 |
| 5,225,489 | 7/1993 | Prevorsek et al. ...................... | 525/151 |
| 5,256,759 | 10/1993 | Kuo ......................................... | 528/176 |
| 5,395,470 | 3/1995 | Toh et al. ........................... | 156/244.11 |
| 5,529,620 | 6/1996 | Corbett et al. .......................... | 106/272 |
| 5,626,703 | 5/1997 | Tomita et al. ..................... | 156/244.11 |

*Primary Examiner*—Vivian Chen
*Attorney, Agent, or Firm*—Birch, Stewart, Kolasch & Birch, L.L.P.

[57] ABSTRACT

A novel polyester film and a process for its preparation are disclosed wherein said film is composed of (a) liquid crystal polyester; (b) non-liquid crystal polyester; and (c) fiberizer capable of substantially fiberizing said liquid crystal polyester (a). Said polyester film shows remarkable improvements in various properties compared with the prior art polyester films: polyester film according to the present invention exhibits: (a) a high modulus of elasticity; (b) a high toughness; (c) a small content of: (1) oligomer, (2) thermal decomposition products and (3) gelation products; and (d) excellent electrical properties, so that this film can be used as a base film for electrical insulating material, capacitors, magnetic recording mediums, etc.

21 Claims, No Drawings

POLYESTER FILM AND PROCESS FOR THE PREPARATION THEREOF

FIELD OF THE INVENTION

The present invention relates to a polyester film which can provide drastic improvements in properties over the prior art polyester films. More particularly, the present invention relates to a polyester film which exhibits a high modulus of elasticity, a high toughness, little content of oligomer, thermal decomposition products and gelation products and provides improvements in electrical properties, etc.

BACKGROUND OF THE INVENTION

One of commonly practiced methods for enhancing the modulus of elasticity of a polyester film is to enhance the degree of molecular orientation by improving the orientation method or the like. Another method is to reinforce the polyester film by finely dispersing a compound having a high modulus of elasticity such as liquid crystal polyester in a non-liquid crystal polyester as disclosed in JP-A-61-78862 (The term "JP-A" as used herein means an "unexamined published Japanese patent application"), JP-B-7-37577 (The term "JP-B" as used herein means an "examined Japanese patent publication") and JP-A-57-25354.

However, if the degree of molecular orientation is excessively raised to enhance the modulus of elasticity of the polyester film, the film is apt to break during the orientation. Thus, the practical enhancement of the modulus of elasticity of a polyester film has been limited.

On the other hand, the foregoing method which comprises finely dispersing a liquid crystal polyester having a high modulus of elasticity in a non-liquid crystal polyester to reinforce the polyester film is apparently effective. However, a typical liquid crystal polyester has a bad compatibility with a non-liquid crystal polyester. Thus, voids can easily be formed around the liquid crystal polyester. In particular, the oriented product of a film comprising a large amount of a liquid crystal polyester incorporated therein has a large amount of voids formed therein, making it impossible to provide a polyester film having a high modulus of elasticity.

It was reported in JP-B-7-37577, etc. that if the liquid crystal polyester to be incorporated in the non-liquid crystal polyester is fibrous, it can provide remarkable enhancement of the modulus of elasticity. A molten liquid crystal polyester which has just been extruded from an extruder which gives a shear rate as high as not less than 200 s$^{-1}$ often assumes a fibrous form. However, once given a shearing action at a rate as low as 10 s$^{-1}$, e.g., by being passed through a filter, even a fibrous liquid crystal polyester which has just been extruded turns spherical. As a result, the enhancement of the modulus of elasticity cannot be recognized as expected.

SUMMARY OF THE INVENTION

It is therefore an object of the present invention to provide a polyester film which can comprise a liquid crystal polyester finely and fibrously dispersed in a non-liquid crystal polyester even shortly after being passed through a low shear rate region such as filter by incorporating a fiberizer in a composite of a liquid crystal polyester with a non-liquid crystal polyester.

The present invention concerns a polyester film comprising a liquid crystal polyester, a non-liquid crystal polyester, and a fiberizer.

DETAILED DESCRIPTION OF THE INVENTION

The term "liquid crystal polyester (LCP)" as used herein is meant to indicate a meltable and liquid crystal-forming polyester having one or more mesogen group in its main chain and/or side chains. A particularly preferred example of such a polyester is one having the following group as a structural unit. Examples of the structural unit derived from diol will be given below.

[Chemical 1]

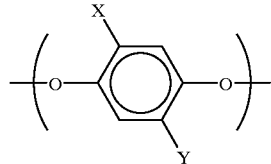

wherein X and Y each independently represent a hydrogen atom, a halogen atom or an alkyl group having not more than 4 carbon atoms;

[Chemical 2]

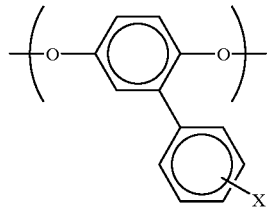

wherein X is as defined above;

[Chemical 3]

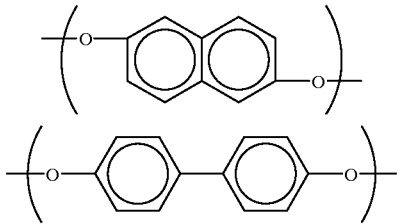

[Chemical 4]

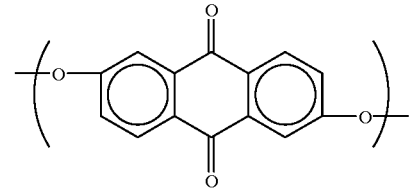

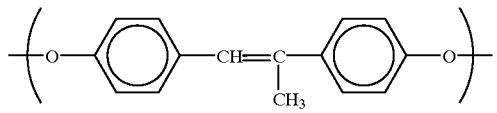

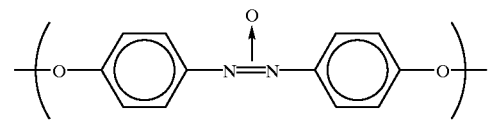

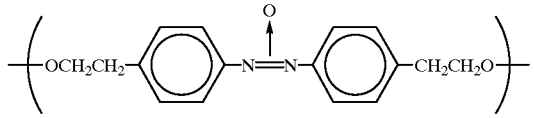

Examples of the structural unit derived from dicarboxylic acid will be given below.

[Chemical 5]

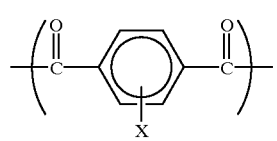

wherein X is as defined above;

[Chemical 6]

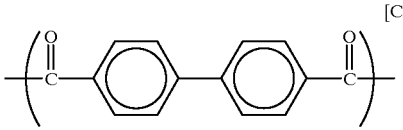

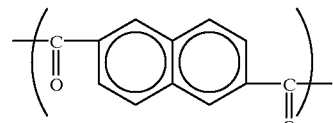

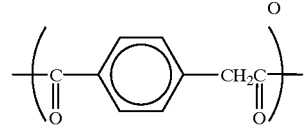

[Chemical 7]

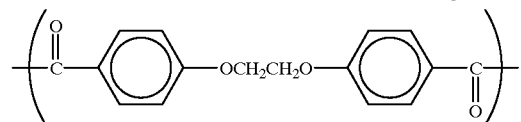

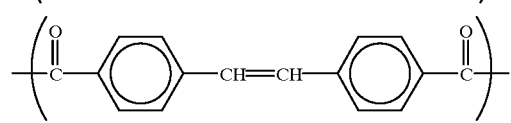

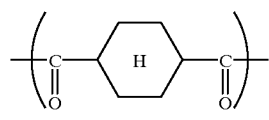

Examples of the structural unit derived from hydroxycarboxylic acid will be given below.

[Chemical 8]

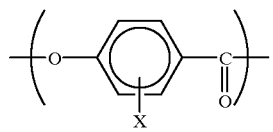

wherein X is as defined above;

[Chemical 9]

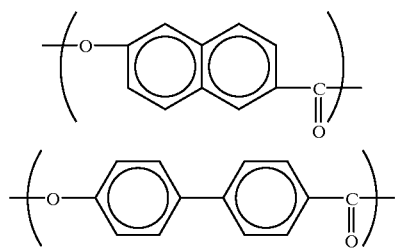

-continued

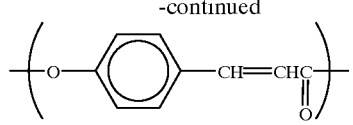

Further, LCP of the present invention can also comprise the following structural units incorporated therein to adjust the melt viscosity and melting point thereof.

[Chemical 10]

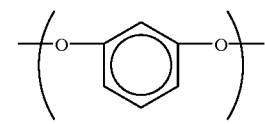

[Chemical 11]

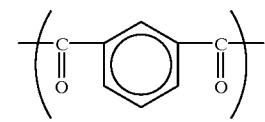

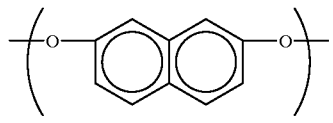

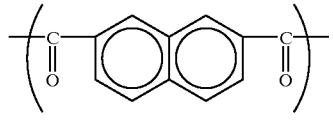

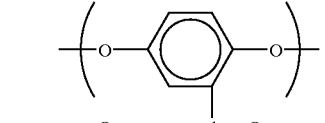

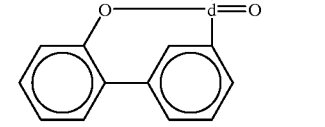

Moreover, LCP of the present invention can also comprise structural units represented by the following general formulae incorporated therein.

Examples of the foregoing structural units include structural units which can make a relatively free rotation between aromatic rings, such as

[Chemical 12]

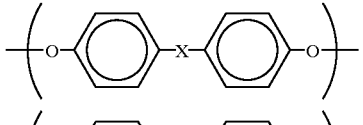

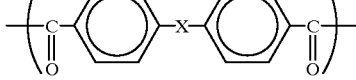

wherein X represents $O$, $CH_2$, $C(CH_3)_2$ or $SO_2$, and structural units derived from aliphatic diol or aliphatic dicarboxylic acid, represented by the following general formulae:

[Chemical 13]

$$-(O-(CH_2)_{\overline{m}}-O)-$$

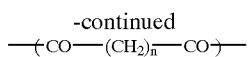
wherein m and n each represent an integer of from 2 to 10.
Particularly preferred examples of these structural units will be given below.
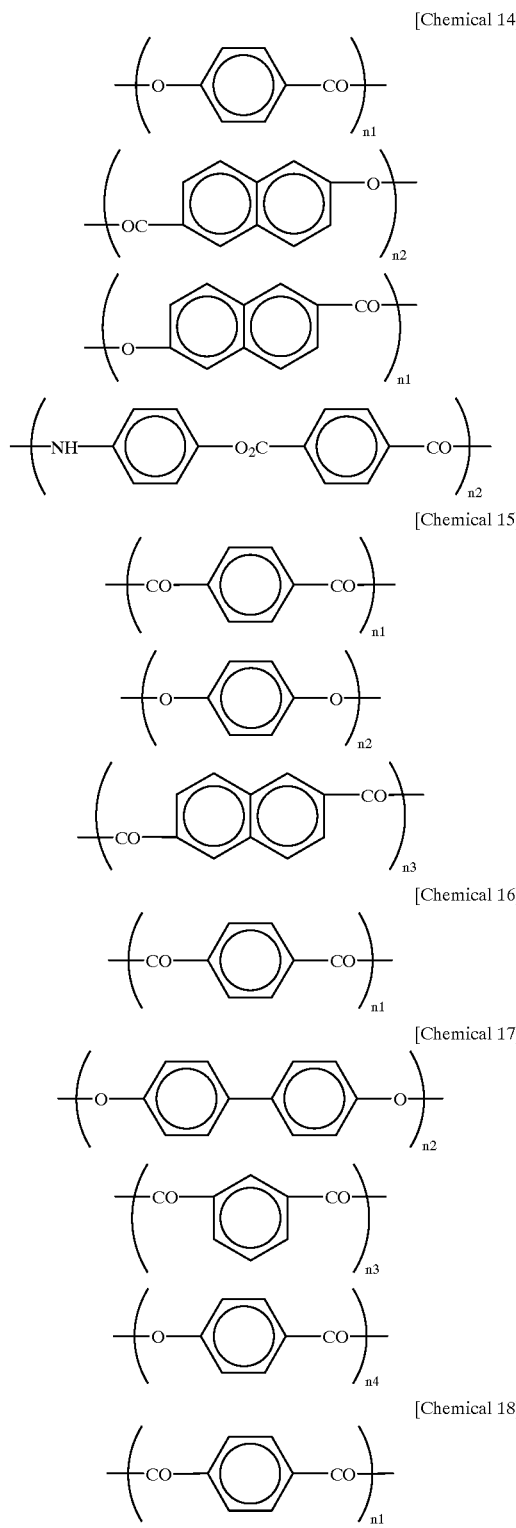
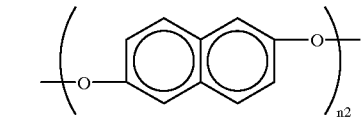
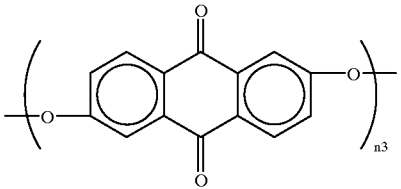
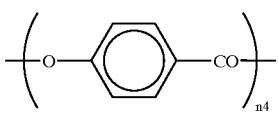
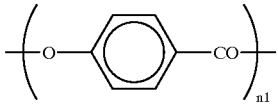
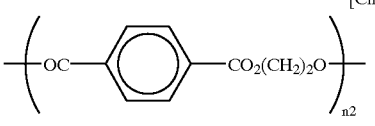
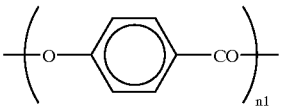
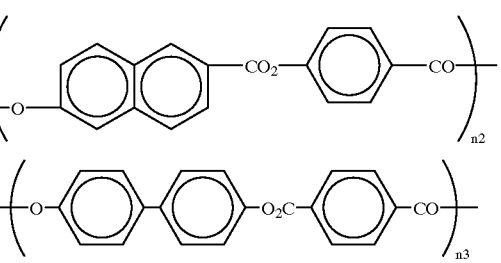
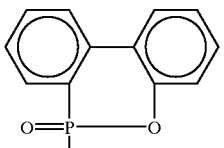
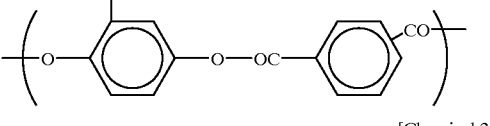
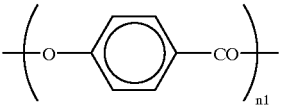
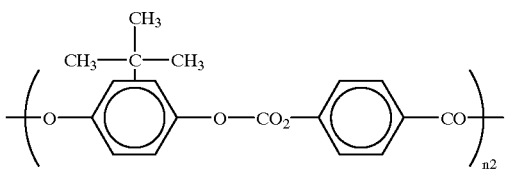

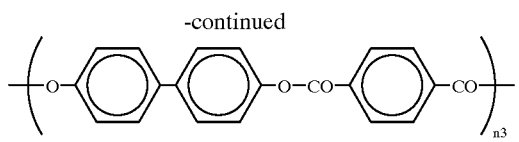

wherein Σni is 100. The suffixes ni each preferably are not less than 4. These polymers may be partially substituted by halogen atoms and various substituents.

In the present invention, the liquid crystal polyester (LCP) is preferably a half-aromatic polyester having a non-liquid crystal aliphatic polyester units rather than a full-aromatic polyester to provide further enhancement of the compatibility with the non-liquid crystal polyester. In other words, the liquid crystal polyester (LCP) preferably comprises a liquid crystal unit and a non-liquid crystal unit in admixture in its molecule. The liquid crystal unit randomly distribute in the liquid crystal polyester chain comprising the liquid crystal unit and the non-liquid crystal unit, from the view point of compatibility with the non-liquid crystal polyester. Referring to the randomness of liquid crystal unit arrangement, as the sequence number of repeating units or blocks capable of providing liquid crystallinity becomes larger, the compatibility of the liquid crystal polyester with the non-liquid crystal polyester is lowered, making the effects of the present invention less remarkable. Accordingly, the sequence number of repeating units of liquid crystal capable of providing liquid crystallinity (as determined by a NMR (nuclear magnetic resonance) spectroscopy proposed by V. A. Nicely et al., in "Macromolecules, 20 573–578 (1987)) is preferably not more than 15, more preferably not more than 10, particularly not more than 5. In this respect, preferred liquid crystal polyesters among the foregoing liquid crystal polyesters are copolymers of p-hydroxybenzoic acid with ethylene glycol, terephthalic acid and 4,4'-dihydroxybiphenyl. In particular, a copolymer comprising p-hydoxybenzoic acid and ethylene terephthalate as main components having 4,4'-dihydroxybiphenyl (DHB) unit and ethylene terephthalate unit preferably in an amount of from 0.1 to 20 mol-% and from 15 to 45 mol-%, more preferably from 3 to 18 mol-% and from 20 to 40 mol-%, respectively, is desirable to provide the foregoing desired randomness. Such a copolymer is also desirable because it has a good compatibility with a polyester comprising polyethylene terephthalate as a main component and it can easily form LCP which assumes a fibrous form having a great L/D ratio.

Further, a copolymer of p-hydroxybenzoic acid with 6-hydroxy-2-naphthoic acid, a copolymer of p-hydroxybenzoic acid with 4,4'-dihydroxybiphenyl, terephthalic acid, isophthalic acid or ethylene glycol, or LCP having cyclohexane bond in its main chain can easily assume a fine fibrous form to maximize the effects of the present invention. Thus, these copolymers are most desirable.

LCP of the present invention preferably exhibits a melt viscosity at 280° C. of from 0.1 to 100 Pa•S, more preferably from 1 to 10 Pa•S so that it can easily be fiberized. On the other hand, the melt viscosity ($\eta_{m1}$) of the non-liquid crystal polyester is preferably as high as from 5 to 1,000 times, more preferably from 10 to 700 times, even more preferably from 30 to 500 times, particularly from 100 to 350 times the melt viscosity ($\eta_2$) of LCP, because it can easily provide the liquid crystal polyester with a greater L/D value. The foregoing control over the melt viscosity ratio is effective for the minimization of the diameter of LCP dispersed in the composite to not more than 1 μm, preferably not more than 0.5 μm, even more preferably not more than 0.3 μm. The fine dispersion of the liquid crystal polyester (LCP) is effective not only for the drastic improvement of various properties such as mechanical properties, chemical properties, electrical properties and optical properties of the polyester film but also for the minimization of heat generated by shear stress during melt extrusion and the filtration pressure developed during the passage through a filter having a small shear rate. Of course, the mere presence of the fine liquid crystal polyester is not sufficiently effective for the reduction of pressure during the filtration at a low shear rate. Accordingly, the filtration pressure can be reduced only when the fine liquid crystal polyester is used in combination with the fiberizer of the present invention.

The inherent viscosity of the non-liquid crystal polyester of the present invention is preferably not less than 0.5, more preferably not less than 0.6, because the physical properties such as mechanical properties and electrical properties of the resulting polyester film can be enhanced. Further, the inherent viscosity of the non-liquid crystal polyester of the present invention preferably ranges from 0.6 to 2.5, more preferably from 0.8 to 2.2, particularly from 1.0 to 1.8. The resulting polyester film preferably exhibits an inherent viscosity of not less than 0.62, more preferably not less than 0.75, from the standpoint of modulus of elasticity, toughness and oligomer content. In order to obtain a polyester film having an inherent viscosity falling within the above define range, the various conditions such as shear rate, melting temperature, screw dimension, starting materials to be used, and additives to be added during melt extrusion may be properly controlled.

The foregoing non-liquid crystal polyester is not specifically limited. Representative examples of the non-liquid crystal polyester include modified products such as polyethylene terephthalate, polybutylene terephthalate, polyhexamethylene terephthalate, polyethylene naphthalate, polycyclohexanemethylene terephthalate, and copolymer thereof. Representative examples of the comonomer include isophthalic acid, phthalic acid, diphenic acid, diphenyldicarboxylic acid, adipic acid, sebacic acid, azelaic acid, dodecanedionic acid, hexahydroterephthalic acid, butanediol, hexanediol, and neopentyl glycol. However, the present invention is not limited to these compounds. Of course, a polyester having an ether component such as diethylene glycol, triethylene glycol, polyethylene glycol and polytetramethylene glycol copolymerized to its main chain may be used. The melting point of the non-liquid crystal polyester is preferably the same as or higher than the melting point of LCP because it can be melted while fulfilling the liquid crystal properties. Although a single non-liquid crystal polyester may be used, a mixture of a plurality of polyester resins having different intrinsic viscosities may be preferably used from the standpoint of practical properties such as thermal dimensional stability.

The content of LCP is preferably from 0.1 to 40% by weight, more preferably from 0.3 to 15% by weight, even more preferably from 0.5 to 10% by weight, because the effects of the present invention, i.e., high modulus of elasticity, high toughness and low contents of oligomer, thermal decomposition products and gelation products, can be fully attained. If the content of LCP falls below 0.1% by weight, the effect of the present invention, i.e., enhancement of the physical properties of the film cannot be fully attained. Further, the heat generated by shear-stress during melt extrusion cannot be minimized to prevent thermal decomposition, making it impossible to obtain a film having little content of foreign substances and a small drop of intrinsic viscosity. On the contrary, if the content of LCP exceeds 40% by weight, a polyester film having a high elasticity, a high toughness and a high dimensional stability well-balanced on the plane thereof cannot be obtained. Further, drastic enhancement of physical properties cannot be provided. Moreover, a high transparency and a proper breaking elongation cannot be provided.

It was already reported that if a liquid crystal polyester is fibrously dispersed, the resulting enhancement of the modulus of elasticity is remarkable. A molten liquid crystal polyester which has just been extruded from an extruder operating at a shear rate as high as 50 to 500 s$^{-1}$ often assumes a fibrous form. Accordingly, if such a molten liquid crystal polyester is directly subjected to injection molding, a molded product in the form of fibrous dispersion can be obtained. However, if such a molten liquid crystal polyester is passed through a region having a shear rate as low as not more than 10 s$^{-1}$ as in the case of the production of a film requiring the filtration through a filter for removing foreign substances, even the liquid crystal which has assumed a fibrous form shortly after extrusion can be subject to the effect of the filter. That is, it can turn spherical in the filter. In some cases, the fiber length L can be reduced, or the fiber diameter can be increased, giving a L/D ratio of fiber as small as less than 10. As a result, the enhancement of the modulus of elasticity cannot be recognized as expected. It is thus necessary that a fiberizer be added to prevent the liquid crystal polyester from agglomerating to form sphere even when passed through a region having a shear rate as low as not more than 10 s-1

The term "fiberizer" as used herein is meant to indicate an additive capable of substantially fiberizing a liquid crystal polyester in the mixture thereof with a non-liquid crystal polyester. It is preferably an additive capable of fiberizing the liquid crystal polyester in such an arrangement that the liquid crystal polyester can be dispersed in the film obtained by melt kneading at a shear rate as low as from 10$^{-2}$ to 10$^{-1}$ so fibrously that the aspect ratio L/D (fiber length L/fiber diameter D) is preferably from 10 to 350. One or more compounds selected from the group consisting of synthetic oils such as silicone oil, organic ester oil, phosphoric ester oil, polyolefin oil and synthetic hydrocarbon oil, mineral oils such as wax, ether compounds such as polyalkylene glycol (e.g., polyethylene glycol), metallic salts of higher aliphatic acids having 10 or more, preferably from 10 to 80 carbon atoms such as calcium stearate and calcium palmitate, oxazoline compounds, particularly bisoxazoline compound, and polyester compounds comprising a polyester containing a liquid crystal mesogen group in an amount of less than 50 mol-% and a ultralow molecular polyester having a number-average molecular weight of from 1,000 to 10,000 is desirable to exert a great effect even when used in a small amount.

More preferably, the fiberizer of the present invention is compounds having non-polar group at its ends so that the non-liquid crystal polyester can be hardly hydrolyzed. Even more preferably, the fiberizer of the present invention is a terminally-hindered polyoxymethylene or polyalkylene glycol having a molecular weight of from 800 to 4,500 because it can give a high aspect ratio even with melt kneading at a lower shear rate. Particularly preferred among these compounds is polyethylene glycol, which has a good compatibility with polyethylene terephthalate. Other particularly preferred examples of the fiberizer include terminally-hindered ultralow molecular polyester having an inherent viscosity [η] of from 0.2 to 0.4, carnauba wax, low molecular polyester having an number-average molecular weight of from about 500 to 10,000 comprising a parahydroxybenzoic acid having a polyethylene terephthalate copolymerized thereto in a proportion of from 50 to 95 mol-%, silicone oil which normally stays solid and exhibits a viscosity as very high as from 10$^4$ to 10$^8$ cs, calcium stearate, and 2,2'(1,3-phenylene)bis(2-oxazoline).

Even the reformed film product obtained by re-melting the polyester film comprising such a fiberizer incorporated therein, and then melt-kneading the molten material at a shear rate of from 10$^{-2}$ to 10 s$^{-1}$ preferably comprises the liquid crystal polyester dispersed therein so fibrously that the aspect ratio L/D (fiber length L/fiber diameter D) is from about 10 to 350. The fiberizer is preferably incorporated in the polyester film in an amount of from 0.01 to 10% by weight to keep the liquid crystal polyester fibrous in the polyester film as desired.

The composite of the present invention comprises a liquid crystal polyester (LCP) dispersed in a non-liquid crystal polyester. The form of dispersion of the liquid crystal polyester (LCP) is particularly important. When LCP is finely and fibrously dispersed in the non-liquid crystal polyester, excellent properties such as high elasticity, low oligomer content and high fluidity can be provided. In other words, when LCP is finely and fibrously dispersed in the non-liquid crystal polyester, the effects of the present invention, i.e., the foregoing various properties can be enhanced as compared with other dispersion forms such as skin-core type dispersion, spot type dispersion and multi-layer type dispersion. Further, the diameter D of LCP fiber is from 0.001 to 1 μm, more preferably from 0.01 to 0.5 μm, even more preferably from 0.05 to 0.3 μm. This arrangement is particularly effective for the enhancement of the various properties. This arrangement also can minimize the heat generated by shear stress during melting and thus is effective from the standpoint of prevention of thermal decomposition. The aspect ratio L/D of the fiber having such an arrangement is preferably from 10 to 350, more preferably from 50 to 300, even more preferably from 100 to 250, to further enhance the modulus of elasticity and fluidity and reduce the oligomer content.

The polyester film of the present invention comprises LCP, a non-liquid crystal polyester and a fiberizer as main constituents. These main constituents may be mixed shortly before melt extrusion. However, a starting material obtained by homogeneously melt-kneading the main constituents or by reclaiming from the polyester film of the present invention may be better used to provide LCP with a greater L/D value. Of course, these starting materials may be used in admixture.

The polyester film of the present invention comprises LCP, a non-liquid crystal polyester and a fiberizer as main constituents. The polyester film of the present invention may further comprise a compatibilizer such as epoxy and oxazoline, a plasticizer, a weathering stabilizer, an oxidation inhibitor, a thermal stabilizer, a lubricant, an antistatic agent, a brightening agent, a colorant, an electrically conducting agent, etc. incorporated therein.

The polyester film of the present invention may have a single-layer structure. This layer may be laminated with other layers of polymer such as polyester, polyolefin, polyamide, polyvinylidene chloride and acrylic polymer. In particular, if a thin polyester layer is laminated as a surface layer, the thickness (d) of the laminating portion is smaller than the average diameter (l) of the particles contained in the laminating portion, preferably 1/1,000 to 1/2, more preferably from 1/100 to 1/10 of l, to provide a film excellent in running behaviours, slipperiness and smoothness. Such a film can be used as a base film for magnetic recording medium requiring good surface properties. In the production of a laminated film consisting of three or more layers made of polyester, a reclaimed starting material or the like may be incorporated in the middle layer to enhance the productivity and product quality. Examples of these particulate materials include silicon oxide, magnesium oxide, calcium carbonate, titanium oxide, aluminum oxide, crosslinked polyester, crosslinked polystyrene, mica, talc, and kaolin. However, the present invention is not limited to these compounds.

The polyester film of the present invention may be used unoriented but is preferably biaxially oriented and heat-treated to produce an oriented film which can exert the effects of the present invention, i.e., high elasticity, high toughness, high heat resistance, low oligomer content and excellent electrical properties, more remarkably.

Examples of the process for the preparation of the polyester film of the present invention will be given below. A starting material obtained by blending a high viscosity non-liquid crystal polyester polymer having a melt viscosity 5 or more times that of the foregoing LCP with a liquid crystal polyester (LCP) and a fiberizer free of polar group, a starting material obtained by melting and homogenizing the foregoing blend or a starting material reclaimed from the film of the present invention is used. Alternatively, 2 or 3 out of these starting materials are used in admixture. The starting material is then melt-formed into a film in a stream of nitrogen or in vacuo by a known method in such a manner that the inherent viscosity thereof doesn't drop. Of course, the higher the shear rate in the extruder is (e.g., not lower than $20\ s^{-1}$, preferably not lower than $50\ s^{-1}$), the smaller is the diameter of dispersed LCP grains in the extruder, making the effects of the present invention greater with a small amount of additives. However, if the shear rate is greater than $300\ s^{-1}$, the excess heat generated by shear stress causes the thermal decomposition of the polymer. In order to remove foreign substances, a known filter such as sintered metal, porous ceramics, sand and metal gauze is preferably used. The shear rate during the passage through such a filter is as low as not more than $10\ s^{-1}$. The only addition of the liquid crystal component cannot provide a remarkable drop of the filtration pressure. But the addition of the fiberizer of the present invention makes it possible to reduce the filtration pressure to a practical range. The restriction of the draw-down ratio at the extrusion to a range of 10 to 200, preferably 15 to 100, can not only reduce the diameter of dispersed fibers of the liquid crystal polyester but also raise the aspect ratio L/D (fiber length/fiber diameter) to a range of 10 to 350, preferably 50 to 300, more preferably 100 to 250. During the melt extrusion, the molten sheet may be cooled (supercooled) to a range of from not lower than the crystallization temperature Tmc to not higher than the melting point Tm before casting in order to further reduce the diameter of dispersed fibers of the liquid crystal polyester and raise the aspect ratio L/D of the fibers to not lower than 10. Thereafter, the cast sheet may biaxially be stretched or rolled and then subjected to heat treatment or the like so that the molecular orientation and crystallization occur. Thus, a biaxially-oriented polyester film can be obtained. During this procedure, the cast sheet is preferably oriented at a temperature higher than the ordinary orientation temperature, i.e., temperature ranging from Tg (glass transition temperature)+10° C. to Tg+70° C., to make the molecular orientation more effective.

The polyester film of the present invention can also be used as a novel heat-sensitive stencil printing film. In other words, the polyester film of the present invention can be provided with the heat of fusion AHu of from 0 to 32 J/g, preferably from 0 to 24 J/g, to provide a film which can then be subjected to print platemaking process by means of a thermal head, laser or LED or by flash exposure or irradiation with infrared rays to form an accurately traced heat-sensitive stencil printing original having a high resolution free from white mark. In some cases, the film of the present invention may be singly used free of paper support to form a heat-sensitive stencil printing original. Further, the polyester film of the present invention can provide a heat-sensitive stencil film which can be stably oriented or heat-treated without film breakage despite its thin layered film thickness to form an excellent heat-sensitive stencil printing original.

The polyester film of the present invention can also be used as a novel electrical insulating film. In particular, if an insulating film impregnated with an electrical insulating oil has a large content of low molecular compounds such as monomer and oligomer, these low molecular compounds are extracted with the oil. These low molecular compounds are deposited in the capillary, hindering the circulation of the oil. The resulting temperature rise causes poor insulation that disables the use of electrical apparatus such as motor. Thus, the use of a film which contains low molecular compounds such as monomer and oligomer in an amount as small as 0.2 to 0.4% by weight, preferably 0.2 to 0.3% by weight, such as polyester film of the present invention, can provide highly reliable electrical products which can maintain a stable electrical insulation over an extended period of time.

The polyester film of the present invention can also be used as a novel magnetic recording medium. The magnetic recording must be made having a large volume of capacity with a high precision even with a small-sized apparatus. To this end, the base film for supporting the magnetic recording layer must be thin in thickness and exhibit a high dimensional stability, i.e., no elongation and deformation. For this purpose, a film having a high modulus of elasticity, i.e., polyester film of the present invention whose summation of Young's modulus in the machine direction and in the transverse direction is to not less than $1,200 \times 10^7$ Pa, preferably from $1,200 \times 10^7$ Pa to $2,000 \times 10^7$ Pa, can be used to advantage.

The polyester film of the present invention can be used as a novel heat-sensitive transfer ribbon film. A heat-sensitive transfer ribbon film is subject to high tension at a high temperature during printing. Thus, a base film which exhibits an excellent thermal dimensional stability, that is, shows no elongation or shrinkage at high temperatures and exhibits a high slipperiness is desired. For this purpose, a film which exhibits a high modulus of elasticity even at high temperatures, i.e., polyester film of the present invention whose summation of Young's modulus in the machine direction and in the transverse direction at room temperature is to not less than $1,000 \times 10^7$ Pa, preferably from $1,000 \times 10^7$ Pa to $1,800 \times 10^7$ Pa, can be used to advantage.

The polyester film of the present invention can also be used as a novel capacitor film. An electrical insulating film must maintain a stable electrical insulation over an extended period of time. The dielectric breakdown of an electrical insulating film depends on magnitude of tan δ, which represents how much an electric energy is converted to heat. The rising temperature of tan δ-temperature curve of this invention film is as high as 100° C. to 180° C. Even if an electric energy is converted to heat, the polyester film of the present invention acts as a highly reliable electrical insulating film which can maintain a stable electrical insulation over an extended period of time.

<Measurement of physical properties>
(1) Inherent viscosity [η]

The measurement of inherent viscosity was effected in o-chlorophenol as a solvent at a temperature of 25° C. The inherent viscosity was determined by the following equation.

Since LCP cannot be dissolved in this solvent, it was removed by centrifugal separation method before measurement.

$$[\eta] = \lim_{c \to 0} (\eta sp/c)$$

wherein the specific viscosity ηsp is obtained by subtracting 1 from the relative viscosity ηr; and c represents concentration. The unit of inherent viscosity represents in dl/g.

(2) Fish eyes (FE)

A 10-cm$^2$ area film was observed under light polarized by crossed nicol. Among areas having different surrounding colors and glittering areas in the entire image, those having a major axis length of not less than 10 μm were counted. (Unit: points/10 cm$^2$)

(3) Oligomer content (% by weight)

100 mg of the polymer specimen was dissolved in 1 ml of o-chlorophenol. The solution was then subjected to liquid chromatography (Model 8500, available from VARIAN Inc.). The oligomer content is represented by weight proportion to polymer.

(4) Number of COOH terminal groups

The polymer specimen was dissolved in o-cresol/chloroform. The solution was then subjected to potentiometric titration method with an alkali to determine the number of COOH terminal groups. (Unit: equivalent (eq)/ton (t))

(5) Young's modulus

The measurement of Young's modulus was effected at a temperature of 25° C. in accordance with JIS K7127. Young's modulus corresponds to the slope of the tensile stress-strain curve. (Unit: Pa (Pascal))

(6) LCP fiber diameter

The film specimen was dipped in liquid nitrogen so that it was thoroughly cooled. The film specimen was then cracked in the air. The section of the film specimen was then observed by a scanning electron microscope (SEM). (Unit: μm)

(7) Melt viscosity $\eta_m$

The melt viscosity was measured at a shear rate of 100 s$^{-1}$ by means of flow tester. (Unit: Pa•S)

(8) Surface roughness Ra

The surface roughness was measured at room temperature with a cutoff value of 0.25 mm in accordance with JIS B0601-1976.

(9) % Thermal shrinkage

The percent dimensional change was determined after 30 minutes of 150° C. heat treatment in accordance with ASTM D1204.

(10) Coefficient of friction

The static/dynamic coefficient of friction was measured in accordance with ASTM D1003-61T.

The present invention will be further described in the following examples, but the present invention should not be construed as being limited thereto.

EXAMPLE 1

As a non-liquid crystal polyester there was used a raw polyethylene terephthalate having an inherent viscosity of 1.4 dl/g. As a liquid crystal polyester (LCP) there was used a liquid crystal polyester (melting point: 260° C.; liquid crystal starting temperature: 240° C.; melt viscosity at 280° C.: 10 Pa•S) comprising 72 mol-% of p-hydroxybenzoic acid, 20 mol-% of ethylene glycol, 28 mol-% of terephthalic acid and 8 mol-% of 4,4'-dihydroxybiphenyl. A mixture of the foregoing polyethylene terephthalate and LCP and a polyethylene glycol having a molecular weight of 1,000 hindered at both ends thereof as a fiberizer was dried and dehydrated. The mixture thus dehydrated was supplied into a 150-mm extruder where it was then melt-kneaded at a temperature of 285° C. and a shear rate of 100 sec$^{-1}$ and measured out. The molten material was passed through a metallic filter made of fibrous sintered stainless steel (10 μm cut) at a shear rate of 10 sec$^{-1}$, and then extruded through a T-die onto a cooling drum which had been kept to 25° C. where it was then cooled and solidified while being electrostatically charged. The cast film thus obtained was then stretched to 4 times original length at a temperature of 110° C. by means of a longitudinal roll type stretching machine to attain a birefringence as high as 0.16. The film thus oriented was then introduced into a tenter where it was stretched to 4 times original width at a temperature of 100° C., cooled to a temperature of 60° C., and then thermally fixed at a temperature of 200° C. to obtain a biaxially-oriented film having a thickness of 8 μm. The properties of the oriented film are set forth in Table 1.

The film of the present invention thus obtained exhibited a high Young's modulus and a small content of foreign substances and oligomer and thus can be used as a base film for magnetic recording medium or heat-sensitive transfer ribbon.

COMPARATIVE EXAMPLES 1–3

The procedure of Example 1 was followed to prepare a biaxially-oriented film except that Comparative Example 1 was free of the fiberizer used in Example 1, Comparative Example 2 was free of the liquid crystal polyester (LCP) used in Example 1 and Comparative Example 3 was free of both the fiberizer and the liquid crystal polyester (LCP). The results set forth in Table 1 show that the absence of liquid crystal polyester (LCP) or fiberizer makes it impossible to obtain a film having a high Young's modulus and a low content of foreign substances and oligomer.

COMPARATIVE EXAMPLE 4

The procedure of Comparative Example 1 was followed to prepare a biaxially-oriented film except that the extruder and the die were directly connected to each other via a polymer pipe to effect extrusion through the T-die instead of use the metallic filter made of fibrous sintered stainless steel (10 μm cut). The results set forth in Table 1 show that the liquid crystal polyester thus obtained assumed a fibrous form because it had not been passed through a filter. However, no films having a high Young's modules were obtained due to a high content of foreign substances and occurrence of numerous fish eyes.

COMPARATIVE EXAMPLE 5

The biaxially-oriented film obtained in Comparative Example 4 was used as a starting material. In the same manner as in Example 1, the starting material was dried/dehydrated, melted, and then supplied into a 150-mm extruder where it was then melt-kneaded at a temperature of 285° C. and a shear rate of 100 sec$^{-1}$ and measured out. The molten material was passed through a metallic filter made of fibrous sintered stainless steel (10 μm cut) at a shear rate of 10 sec$^{-1}$, and then extruded through a T-die onto a cooling drum which had been kept to 25° C. where it was then cooled and solidified while being electrostatically charged. The cast film thus obtained was then stretched to 4 times original length at a temperature of 110° C. by means of a longitudinal roll type stretching machine to attain a birefringence as high as 0.16. The film thus oriented was then introduced into a tenter where it was stretched to 4 times original width at a temperature of 100° C., cooled to a temperature of 60° C., and then thermally fixed at a temperature of 200° C. to obtain a biaxially-oriented film having a thickness of 8 μm. The properties of the oriented film are set forth in Table 1.

The results set forth in Table 1 show that the liquid crystal polyester free of fiberizer cannot turn fibrous but spherical when passed through a filter having a low shear rate.

EXAMPLE 2

As a non-liquid crystal polyester there was used a polyethylene-2,6-naphthalate (inherent viscosity: 1.0; melting point: 278° C.; melt viscosity at 285° C.: 2,500 Pa•S). As a liquid crystal polyester there was used a liquid crystal polyester (melting point: 270° C.; liquid crystal starting temperature: 253° C.; melt viscosity at 285° C.: 25 Pa•S) comprising 60 mol-% of p-hydroxybenzoic acid, 30 mol-% of ethylene glycol, 40 mol-% of 2,6-naphthalnedicarboxylic acid and 10 mol-% of 4,4'-dihydroxybiphenyl. As a fiberizer there was used a dimethyl polysiloxane which exhibits a viscosity of $10^3$ m$^2$/S at room temperature. A mixture of the foregoing polyethylene terephthalate, LCP and fiberizer was dried at a temperature of 180° C. in vacuo, and then supplied into a 250-mm extruder where it was then melted at a temperature of 285° C. The molten material was passed through a metallic filter made of fibrous sintered stainless steel (5 μm cut) at a shear rate of 3 sec$^{-1}$, and then extruded through a T-die spinneret onto a cooling drum which had been kept to 25° C. where it was then cooled and solidified while being electrostatically charged. The cast film thus obtained was stretched to 5.5 times original length at a temperature of 135° C. by means of a longitudinal roll type stretching machine. The film thus oriented was then introduced into a tenter where it was stretched to 5 times original width at a temperature of 130° C., and then thermally fixed at a temperature of 220° C. to obtain a biaxially-oriented film having a thickness of 6 μm. The properties of the oriented film are set forth in Tables 1 and 2.

The film of the present invention thus obtained exhibited a high Young's modulus and a small content of foreign substances and oligomer and thus can be used as a base film for magnetic recording medium or heat-sensitive transfer ribbon.

EXAMPLES 3–7

The procedure of Example 1 was followed to prepare biaxially-oriented films having a thickness of 8 μm except that the content of the fiberizer in the film was changed in various ways. The properties of these oriented films are set forth in Tables 1 and 2. Some kinds of fiberizers, if used in a very small amount, can provide the liquid crystal polyester with a small L/D rate, making it difficult to obtain a film which can accomplish the effects of the present invention, i.e., high Young's modulus and small content of foreign substances and oligomer. On the contrary, if a fiberizer is used in a very large amount, the resulting liquid crystal polyester can assume a fibrous form but can hardly accomplish the foregoing effects of the present invention.

EXAMPLES 8–12

The procedure of Example 1 was followed to prepare biaxially-oriented films having a thickness of 8 μm except that the content of LCP in the film was changed in various ways. The properties of these oriented films are set forth in Table 1. The use of a fiberizer in a very small amount can make it difficult to obtain a film which can exert the effects of the present invention developed by the incorporation of a liquid crystal polyester, i.e., high Young's modulus and small content of foreign substances and oligomer. On the contrary, the use of a fiberizer in a very large amount can cause the formation of voids and thus make it difficult to exert the foregoing effects of the present invention.

EXAMPLE 13

The film obtained in Example 1 was directly supplied into a twin-screw vented extruder where it was melt at a temperature of 285° C. and a shear rate of 250 s$^{-1}$ while being vacuum-defoamed and then measured out by means of a gear pump. The molten material was passed through a filter made of a fibrous sintered stainless steel (7 μm cut) at a shear rate of 5 s$^{-1}$, and then extruded through a T-die onto a cooling drum which had been kept to a temperature of 25° C. where it was then cooled and solidified while being electrostatically charged. The film thus obtained was then biaxially oriented and heat set in the same manner as in Example 1 to obtain a film having a thickness of 8 μm.

The film thus obtained had LCP finely dispersed therein because it had undergone two extrusion steps. The film also had LCP kept dispersed fibrously therein due to the action of the fiberizer. Thus, the film exhibited a high Young's modulus.

EXAMPLE 14

As a non-liquid crystal polyester there was used a raw polyethylene terephthalate having an inherent viscosity of 1.2 dl/g. As a liquid crystal polyester (LCP) there was used a liquid crystal polyester (melting point: 255° C.; liquid crystal starting temperature: 230° C.; melt viscosity at 280° C.: 5 Pa•S) comprising 60 mol-% of p-hydroxybenzoic acid, 30 mol-% of ethylene glycol, 40 mol-% of terephthalic acid and 10 mol-% of 4,4'-dihydroxybiphenyl. A mixture of 80% by weight of the foregoing polyethylene terephthalate, 10% by weight of LCP and 1% by weight of a polyethylene glycol having a molecular weight of 4,000 hindered at both ends thereof as a fiberizer was hot-air dried so that it was dehydrated to a water content of not more than 15 ppm. The mixture thus dehydrated was supplied into a 150-mm main extruder with a double flighted screw. On the other hand, as a non-liquid crystal polyester there was used a raw polyethylene terephthalate having an inherent viscosity of 0.8 dl/g (comprising a colloidal silica having an average particles diameter of 0.25 μm as an additive in an amount of 0.15% by weight). The starting material was hot-air dried so that it was dehydrated to a water content of not more than 25 ppm, and then supplied into a 60-mm subsidiary extruder with a double flighted screw. These materials were each melt-kneaded at a temperature of 285° C. and a shear rate of not less than 100 sec$^{-1}$, and then measured out by means of a gear pump. The molten materials were each passed through a metallic filter made of fibrous sintered stainless steel (5 μm cut) at a shear rate of 10 sec$^{-1}$, and then together extruded through a three-layer composite T-die in such a manner that the non-liquid crystal polyester layer formed both surface layers. The film thus extruded was then cooled and solidified on a cooling drum which had been kept to a temperature of 25° C. while being electrostatically charged. The cast film thus obtained was stepwise longitudinally stretched to 2 times original length at 110° C. and then to 2.7 times original length at 85° C. by means of a longitudinal roll type stretching machine to attain a birefringence as high as 0.19. The film thus oriented was then introduced into a tenter where it was stretched to 4.1 times by an original width at a temperature of 90° C., cooled to a temperature of 60° C., and then thermally fixed at a temperature of 200° C. to obtain a biaxially-oriented film having a thickness of 6 μm. The properties of the oriented film are set forth in Table 2.

The film of the present invention thus obtained exhibited a high Young's modulus, a small content of foreign substances and oligomer and had a smooth and slippery surface and thus can be used as a base film for magnetic recording medium or heat-sensitive transfer ribbon.

As mentioned above, the polyester film of the present invention comprises a composite of a liquid crystal polyester and a non-liquid crystal polyester and a fiberizer. In this structure, the liquid crystal polyester can be finely and fibrously dispersed in the non-liquid crystal polyester to attain the following excellent properties:

(1) A film having a high modulus of elasticity can be obtained. Further, a film whose Young's modulus in the machine direction and in the transverse direction sums to not less than $1,200 \times 10^7$ Pa, preferably not less than $1,600 \times 10^7$ Pa if the conditions are optimized, can be obtained.

(2) A film having an oligomer content as small as not more than 0.4 wt-% can be obtained.

(3) Even a polyester having a high inherent viscosity, i.e., high melt viscosity, if mixed with a specific liquid crystal polyester, can show a drastic melt viscosity drop, regardless of whether the shear rate is low or high. Thus, even when the extruder output is raised, the rise in the current required for driving the screw of extruder is small. Further, the the heat generated by shear-stress in the extruder is small enough to prevent thermal decomposition. Moreover, even when the molten polyester is passed through a high precision fine filter to remove foreign substances, no troubles such as filtration pressure rise and heat deterioration occur.

(4) The arrangement of the present invention is useful particularly for polyester film having a high molecular weight and a high inherent viscosity, not to mention ordinary molecular weights. Thus, a film having a high modulus of elasticity and a small content of oligomer, gelation products and foreign substances can be obtained.

(5) The polyester film of the present invention exhibits excellent properties for electrical insulating material, capacitor, magnetic recording medium, OA, FA, etc.

TABLE 1

| | Non-liquid crystal polyester | | Liquid crystal polyester | | Fiberizer | [η] of | LCP form | | Young's modulus | >10 μm | Oligomere |
|---|---|---|---|---|---|---|---|---|---|---|---|
| | [η] of material | Content (wt %) | m.v. (poise) | Content (wt %) | content (wt %) | non-liquid polyester | D μ | L/D | ($\times 10^7$ Pa) MD/TD | FE points/ 10 cm² | content (wt %) |
| Example 1 | 1.4 | 91.5 | 100 | 8 | 0.5 | 1.28 | 0.3 | 100 | 11000/600 (1600) | 0 | 0.5 |
| Comparative Example 1 | 1.4 | 92 | 100 | 8 | — | 0.95 | 1 | 1 | 700/475 (1175) | 7 | 0.51 |
| Comparative Example 3 | 1.4 | 100 | — | — | — | 0.85 | — | — | 600/400 (1000) | 18 | 0.65 |
| Comparative Example 2 | 1.4 | 99.5 | — | — | 0.5 | 0.88 | — | — | 590/420 (1010) | 15 | 0.68 |
| Comparative Example 4 | 1.4 | 92 | 100 | 8 | — | 0.91 | 0.5 | 5 | 600/400 (1000) | >100 | 0.70 |
| Comparative Example 5 | 1.4 | 92 | 100 | 8 | — | 0.78 | 3.8 | 1 | 530/375 (905) | >100 | 1.2 |
| Example 2 | 1.0 | 89.5 | 250 | 10 | 0.5 | 0.95 | 0.1 | 255 | 1250/650 (19000) | 0 | 0.12 |
| Example 3 | 1.4 | 91.995 | 100 | 8 | 0.005 | 0.95 | 2.5 | 3 | 720/420 (1140) | 2 | 0.55 |
| Example 4 | 1.4 | 91.97 | 100 | 8 | 0.03 | 1.05 | 1.3 | 25 | 930/550 (1480) | 0 | 0.43 |
| Example 5 | 1.4 | 90.5 | 100 | 8 | 1.5 | 1.21 | 0.2 | 188 | 1120/590 (1710) | 0 | 0.28 |
| Example 6 | 1.4 | 86.5 | 100 | 8 | 5.5 | 1.15 | 0.1 | 250 | 975/520 (1495) | 0 | 0.33 |
| Example 7 | 1.4 | 77.0 | 100 | 8 | 15.0 | 0.99 | 1.7 | 69 | 720/430 (1150) | 5 | 0.78 |
| Example 8 | 1.4 | 99.45 | 100 | 0.05 | 0.5 | 0.81 | 0.1 | 8 | 720/430 (1150) | 12 | 0.81 |
| Example 9 | 1.4 | 99.0 | 100 | 0.5 | 0.5 | 0.91 | 0.1 | 22 | 890/450 (1340) | 7 | 0.55 |
| Example 10 | 1.4 | 84.5 | 100 | 15 | 0.5 | 1.20 | 0.3 | 155 | 1075/610 (1685) | 0 | 0.28 |
| Example 11 | 1.4 | 69.5 | 100 | 30 | 0.5 | 1.02 | 1.5 | 230 | 875/440 (1315) | 3 | 0.27 |
| Example 12 | 1.4 | 54.5 | 100 | 45 | 0.5 | 0.85 | 3.8 | 80 | 610/400 (1010) | 26 | 0.25 |
| Example 13 | 1.28 | 91.5 | 100 | 8 | 0.5 | 1.10 | 0.08 | 300 | 1150/650 (1800) | 0 | 0.3 |

TABLE 2

| Characteristics | Unit | Value (machine/transverse direction) |
|---|---|---|
| Film thickness | | 6 |
| Surface layer | μm | each 0.05 |
| Middle layer | | 5.9 |
| Young's modulus | $10^7$ Pa | 1020/550 |
| >10μm Fish eye | points/10 cm$^2$ | 0 |
| Oligomer content | wt % | 0.33 |
| Surface roughness Ra | mμm | 10 |
| Coefficient of friction | | 0.4/0.2 |
| Thermal shrinkage (150° C.) | % | 0.1/0 |

The polyester film of the present invention can be used singly. The polyester film of the present invention may be laminated with other materials, printed with a pattern or surface-treated. The polyester film of the present invention may also be formed, oriented or vacuum-metallized.

The polyester film of the present invention can be preferably used as a base film for electrical insulating material, capacitor, magnetic recording medium, OA, FA, etc.

While the invention has been described in detail and with reference to specific embodiments thereof, it will be apparent to one skilled in the art that various changes and modifications can be made therein without departing from the spirit and scope thereof.

What is claimed is:

1. A polyester film, comprising (i) from 0.1 to 40% by weight of liquid crystal polyester, (ii) a non-liquid crystal polyester and (iii) a fiberizer agent which fiberizes the liquid crystal polyester wherein the aspect ratio L/D is at least 10, with L being the fiber length and D being the fiber diameter.

2. The polyester film according to claim 1, wherein said fiberizer is one which fiberizes the liquid crystal polyester in such an arrangement that the liquid crystal polyester is dispersed in the film obtained by melt kneading at a shear rate from $10^{-2}$ to 10 s$^{-1}$.

3. The polyester film according to claims 1 or 2, wherein a starting material comprising are claim material of said polyester film as a main component is extruded into a film through a melt kneading at a shear rate from $10^{-2}$ to 10 s$^{-1}$, and wherein the liquid crystal polyester is dispersed in the film wherein the aspect ratio L/D is not less than 10, with L being the fiber length and D being the fiber diameter.

4. The polyester film according to claims 1 or 2, wherein the diameter D of said liquid crystal polyester fiber in the film is not less than 1 μm.

5. The polyester film according to claims 1 or 2, wherein said fiberizer comprises at least one compound selected from the group consisting of synthetic oils; mineral oils; either compounds; oxazoline compounds; higher aliphatic acids having 10 or more carbon atoms; metallic salts thereof; polyesters having a liquid crystal mesogen group in an amount of less than 50 mol-%; and polyester compounds comprising an ultralow molecular polyester having a number-average molecular weight Mn of 1,000 to 10,000.

6. The polyester film according to claims 1 or 2, wherein said fiberizer does not have any polar groups in either end group thereof.

7. The polyester film according to claims 1 or 2, wherein said fiberizer is incorporated therein in an amount of from 0.01 to 10% by weight.

8. The polyester film according to claims 1 or 2, wherein said liquid crystal polyester comprises an ethylene terephthalate unit in an amount of at least 15 mol-%.

9. The polyester film according to claims 1 or 2, wherein said liquid crystal polyester comprises a 4,4'-dihydroxybiphenyl unit in an amount of from 0.1 to 20 mol-%.

10. The polyester film according to claims 1 or 2, wherein the ratio (ηm1/ηm2) of the melt viscosity ηm1 of said non-liquid crystal polyester to the melt viscosity ηm2 of said liquid crystal polyester is not less than 5.

11. The polyester film according to claims 1 or 2, wherein said liquid crystal polyester is incorporated therein in an amount of from 0.3 to 15% by weight.

12. The polyester film according to claims 1 or 2, wherein said liquid crystal polyester is incorporated therein in an amount of from 0.5 to 10% by weight.

13. The polyester film according to claims 1 or 2, wherein the inherent viscosity of said non-liquid crystal polyester is not less than 0.6.

14. The polyester film according to claims 1 or 2, wherein said non-liquid crystal polyester comprises at least one selected from the group consisting of polyethylene terephthalate, polyethylene naphthalate, and modification products thereof.

15. The polyester film according to claims 1 or 2, obtained by casting at a draw-down ratio of not less than 10 during the melt extrusion of the film.

16. The polyester film according to claim 15, obtained by cooling to a temperature ranging from not lower than the crystallization temperature Tmc to not higher than the melting temperature TM in the die during the melt extrusion, followed by casting.

17. The polyester film for electrical insulation according to claims 1 or 2, wherein the oligomer content is not more than 0.4% by weight.

18. The polyester film for magnetic recording according to claims 1 or 2, wherein the sum of Young's modulus in the machine direction and in the transverse direction is not less than 1,200×10$^7$ Pa.

19. The polyester film for heat-sensitive ribbon according to claims 1 or 2, wherein the sum of Young's modulus in the machine direction and in the transverse direction is not less than 1,000×10$^7$ Pa.

20. The polyester film for thermo-stencil printing according to claims 1 or 2, wherein the heat of fusion ΔHu is not more than 32 J/g.

21. The polyester film for capacitor according to claims 1 or 2, wherein the temperature at which tan δ rises is not lower than 100° C.

* * * * *